Aug. 24, 1926.
H. A. STENNING
JOINTING MEANS
Filed Oct. 26, 1925
1,597,214
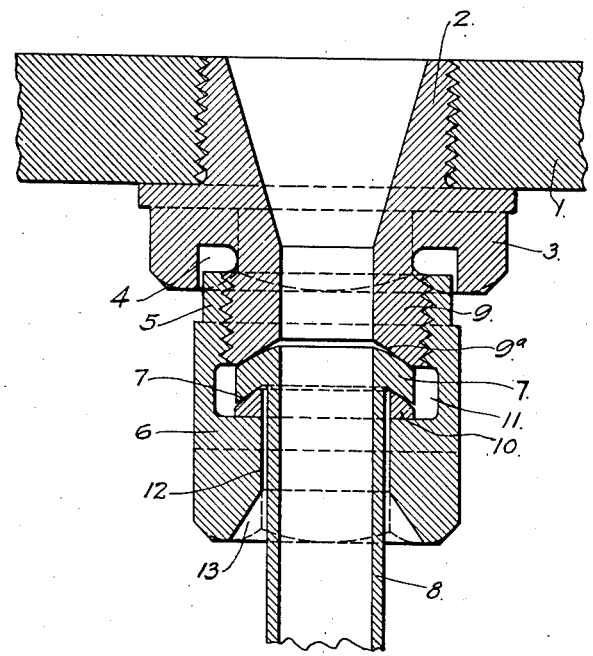
Harry A. Stenning
INVENTOR.
BY
O. V. Thiele
ATTORNEY.

Patented Aug. 24, 1926.

1,597,214

UNITED STATES PATENT OFFICE.

HARRY ALEXANDER STENNING, OF BERKAMSTEAD, ENGLAND, ASSIGNOR TO THE SUPERHEATER COMPANY, OF NEW YORK, N. Y.

JOINTING MEANS.

Application filed October 26, 1925. Serial No. 65,011.

This invention relates to and consists in improvements in means for connecting or jointing the ends of steam superheating pipes or superheater elements to headers to steam distributors and collectors. The invention is, however, not restricted to the jointing of superheater pipes to headers, but is also applicable to the jointing of other pipes to headers, collectors, or vessels, or to the jointing of one pipe to another.

The present invention relates principally to the type of jointing means, heretofore proposed for connecting the ends of superheater pipes or elements to headers, in which the ends (i. e. the steam inlet end and the steam outlet end) of each pipe are independently connected to the header by means of jointing members one of which is screwed into or otherwise secured to the wall of the header and is provided or formed with a jointing face or seat at or in its outer portion or end which projects from the wall of the header, another member having a jointing face being secured to the end of the pipe, while a third jointing member consists of a nut which is screwed up on the member secured to the header and by bearing against the member secured to the end of the pipe holds the face on this member tightly against the face or seat on or in the member secured to the header.

The present invention has for its object to provide improved jointing means of the type above indicated wherein essential parts of the jointing members are or can be adequately protected, for instance from the injurious effects of hot gases of combustion, and, further, to provide a flexible jointing for the ends of the pipes.

The present invention consists principally in means for jointing the ends of superheater elements or other pipes to a header or the like, wherein the members of each such jointing means are so constructed and arranged that each pipe end is jointed, by a ball and cone or ball and socket joint, to the header or the like independently of any other pipe in a yielding or flexible but steam tight manner.

Further according to the present invention the female jointing member in the form of a nut, to be screwed up on the male screwed jointing member, is so formed or constructed that a cavity or chamber is provided within the body of the nut between its outer or lower end and the internally screwed portion or extension of the nut; further the jointing member on the end of the pipe consists of a head or flange provided fixedly on (preferably formed integrally with) the end of the pipe, and the opposite or upper and lower sides or faces of this jointing member are shaped or made in the form of conical or spherical faces adapted to contact or co-operate with spherically or conically formed jointing faces provided respectively on the end of the male jointing member, which may be that member provided in the wall of the header, and on the bottom of the above mentioned chamber within the body of the nut, the said chamber being such as to provide an annular space surrounding the said head or flange on the end of the pipe when the parts or jointing members are assembled to make the required fluid tight joint between the flange or head on the pipe and the screwed male jointing member previously mentioned. Further the hole or bore in the outer or lower portion of the nut, through which the pipe extends, is of such a diameter as to provide an adequate clearance between the wall of the said hole or bore and the pipe.

All of the above mentioned faces, i. e. the faces on the opposite sides of the head or flange on the end of the pipe, the face on the lower or outer end of the jointing member secured to the header and the face provided on the bottom of the cavity or chamber in the body of the nut, might be spherical faces; it is however preferable to provide a conical face on the lower or outer end of the male jointing member and a conical face on the lower or inner side (i. e. the side remote from the male member) of the flange or head on the end of the pipe as above described.

Further according to this invention the above-mentioned spherical jointing face provided on the bottom of the chamber or cavity within the body of the nut consists of a loose annular member or ring surrounding the portion of the pipe adjoining the above mentioned head or flange thereon, the said member or ring resting on the bottom of the said chamber or cavity and having its face adjacent to the head or flange on the pipe formed as a spherical face adapted to contact or co-operate with the adjacent face on the outer or lower side of the said flange or head when the parts are assembled.

Further according to this invention in the preferred embodiment thereof, the male jointing member has formed on it a flange or collar which is located between the inner or upper and the outer or lower ends of the said member, and an annular recess or chamber is formed in the outer face of the said flange, the said recess being such as to receive the end of the aforesaid internally screw female threaded portion or extension of the nut when the parts are assembled.

The invention further consists in jointing means for connecting the ends of pipes to a header or vessel substantially as hereinafter described with reference to the accompanying drawing which is a sectional elevation of a joint made by jointing means according to one specific embodiment of the invention.

In the drawings:—

1 is the wall of the header into which is screwed the jointing member 2 as shown; the member 2 is provided with a flange or lateral extension 3 the inner face of which, in the embodiment illustrated, bears against the wall of the header 1 and the outer face having formed in it an annular recess or chamber 4 adapted to receive the adjacent end of an internally screw threaded part or extension 5 of the nut 6. 7 is the head or flange provided on, preferably formed integral with, the end of the pipe 8; the upper or inner face 7ª of the said flange 7 is made spherical in shape and, when the parts are assembled, bears against the conical face or seat 9ª on the outer or lower end of the externally screw-threaded portion or projection 9 of the before mentioned member 2. The lower or outer side or face 7ª of the head or flange 7 is, as shown, a conical face.

10 is a loose jointing ring the outer or lower flat side or face of which rests on the bottom of the chamber or cavity 11 formed in the body of the nut 6, and the upper or inner side of the ring 10 is made in the form of a spherical face which bears against the adjacent conical face 7ª of the flange 7.

The central bore or hole of the nut 6 is of such dimension as to provide an adequate clearance 12 between the wall of the said bore or hole and the portion of the pipe 8 disposed therein.

The bore or hole in the nut 6 is enlarged or flared as shown at 13 to provide a recess or space around the pipe 8. The member 2 is provided with a central bore or hole which, when the spherical face of the flange 7 on the pipe 8 bears against the seat 9ª on the projection 9, coincides with the bore of the pipe 8.

The annular chamber 4 and the enlarged portion 13 of the bore in the nut 6 may with advantage be filled with asbestos, fire-clay or any other suitable heat resisting material to further protect the members of the joint from the injurious effects of hot gases of combustion.

The faces on the opposite or inner and outer sides of the flange or head 7 on the pipe 8, together with the faces respectively on the outer or lower end of the part 9 of the jointing member 2 and on the jointing ring 10, the clearance provided by the chamber or cavity 11 in the seat surrounding the periphery of the flange 7 on the end of the pipe 8, and the clearance provided at 12 between the pipe 8 and wall of the bore in the nut 6, provide a flexible or ball-and-cone type of joint by which the ends of the pipes are secured to the header or vessel in a yieldable yet steam tight manner.

Whilst the jointing means according to the invention has been hereinbefore described, and is shown in the drawing, as applied for jointing a pipe end to a header or vessel it is to be understood that the jointing means according to the invention may be applied to jointing one pipe with another, in which case the end of one of the pipes would be formed as, or provided with means constituting, the hereinbefore described male member of the jointing means. For instance a jointing member comprising the threaded body portion 9, the surface 9ª, and the flange or cup 3 might be screwed on, or welded to, the end of the one pipe, the head 7 being formed or provided on the end of the other pipe which would also carry the ring 10 and nut 6.

What I claim is:

1. In apparatus of the class described, the combination of a jointing member having a central, externally threaded projecting portion, and a flange with an annular cavity adjacent to the inner end of the projecting portion; and an internally threaded nut engaging the threads of the projecting portion, said nut having an externally cylindrical portion extending into said annular cavity.

2. In apparatus of the class described, the combination of a jointing member having a central externally threaded projecting portion and having a bore extending through it coaxially with said projecting portion; a flange integral with the jointing member and provided with an annular cavity adjacent to the inner end of the projecting portion; a nut having a central bore a portion of which is enlarged and threaded whereby an internal shoulder is formed, said threaded portion engaging the thread on the projecting part of the jointing member, and having an externally cylindrical portion extending into said annular cavity; and a pipe having a flanged end, said pipe extending through the smaller part of the bore of the nut and said flange being clamped by said shoulder to said projecting portion of the jointing member.

3. In apparatus of the class described, the combination of a jointing member having a central externally threaded projecting portion and having a bore extending through it coaxially with said projecting portion; a flange integral with said jointing member and provided with an annular cavity adjacent to the inner end of the projecting portion; the projecting portion having a conical seat surrounding the outer end of the bore; a nut having a central bore a portion of which is enlarged and threaded whereby an internal shoulder is formed, said threaded portion engaging the thread on the projecting part of the jointing member, and having an externally cylindrical portion extending into said annular cavity; a pipe having a flanged end, said pipe extending through the smaller part of the bore of the nut, and said pipe flange being spherical on its outer side and conical on its inner side; and a ring surrounding the pipe and having a spherical face and a flat face the former engaging the conical face of the pipe flange and the latter engaging the shoulder; the nut pressing the ring against the pipe flange and the pipe flange against the seat.

HARRY A. STENNING.